United States Patent
San

(10) Patent No.: US 10,965,905 B2
(45) Date of Patent: Mar. 30, 2021

(54) IMAGE PROCESSING METHOD AND ASSOCIATED IMAGE PROCESSING CIRCUIT

(71) Applicant: Realtek Semiconductor Corp., HsinChu (TW)

(72) Inventor: Guangyu San, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/541,159

(22) Filed: Aug. 15, 2019

(65) Prior Publication Data
US 2020/0195881 A1    Jun. 18, 2020

(30) Foreign Application Priority Data
Dec. 14, 2018  (CN) .......................... 201811532931.0

(51) Int. Cl.
*H04N 7/01* (2006.01)
*H04N 5/14* (2006.01)

(52) U.S. Cl.
CPC ............. *H04N 7/014* (2013.01); *H04N 5/145* (2013.01); *H04N 7/0127* (2013.01); *H04N 7/0142* (2013.01)

(58) Field of Classification Search
CPC ...... H04N 7/014; H04N 7/0142; H04N 5/145; H04N 7/0127
See application file for complete search history.

(56) References Cited

U.S. PATENT DOCUMENTS

| | | | | | |
|---|---|---|---|---|---|
| 5,347,311 | A | * | 9/1994 | Golin | H04N 19/61 375/240.12 |
| 5,440,350 | A | * | 8/1995 | Golin | H04N 19/503 348/416.1 |
| 5,784,114 | A | * | 7/1998 | Borer | H04N 7/014 348/443 |
| 2003/0206246 | A1 | * | 11/2003 | De Haan | G06T 7/238 348/699 |
| 2007/0297513 | A1 | * | 12/2007 | Biswas | H04N 7/014 375/240.16 |
| 2009/0290809 | A1 | * | 11/2009 | Yamada | G06T 7/215 382/266 |
| 2010/0061462 | A1 | * | 3/2010 | Ichiki | H04N 19/14 375/240.16 |

(Continued)

FOREIGN PATENT DOCUMENTS

TW      201023096 A1    6/2010
TW      201027458 A1    7/2010

*Primary Examiner* — Zaihan Jiang
(74) *Attorney, Agent, or Firm* — Winston Hsu

(57) ABSTRACT

The present invention provides an image processing method, wherein the method includes the steps of: receiving an image signal including a first frame and a second frame; determining edges of a foreground in the first frame and the second frame according to at least one motion vector of the first frame and the second frame; determining an edge of the foreground in an interpolated frame according to the edge of the foreground in the first frame and the edge of the foreground in the second frame; and directly using one or more motion vectors of a background adjacent to the foreground in the first frame or the second frame to serve as one or more motion vectors of an outer region of the edge of the foreground in the interpolated frame.

7 Claims, 3 Drawing Sheets

(56) References Cited

U.S. PATENT DOCUMENTS

| | | | |
|---|---|---|---|
| 2010/0177974 A1* | 7/2010 | Chen .................... | H04N 19/139 |
| | | | 382/236 |
| 2010/0239019 A1* | 9/2010 | Bock .................... | H04N 19/593 |
| | | | 375/240.16 |
| 2013/0230107 A1* | 9/2013 | Chen .................... | H04N 19/567 |
| | | | 375/240.16 |
| 2014/0168040 A1* | 6/2014 | Bastani ................ | G09G 3/2003 |
| | | | 345/84 |
| 2017/0094310 A1* | 3/2017 | Dong .................... | H04N 19/527 |
| 2018/0007381 A1* | 1/2018 | Solar .................... | H04N 19/102 |
| 2018/0374218 A1* | 12/2018 | Avidor .................... | G06T 7/246 |

* cited by examiner

IMAGE PROCESSING METHOD AND ASSOCIATED IMAGE PROCESSING CIRCUIT

BACKGROUND OF THE INVENTION

1. Field of the Invention

The present invention is related to image processing, and more particularly, to an image processing method and an associated image processing circuit.

2. Description of the Prior Art

For the purpose of increasing a frame rate to obtain a better display effect, an interpolated frame between two frames may be generated. Motion vector(s) and related image contents may be generated by motion estimation and motion compensation (MEMC). The motion estimation may cause a halo effect when an object moves fast in the image, however. A common MEMC process for eliminating the halo effect has the following problems: a width of the halo is too large; edges of the halo are misaligned; and strength of halo reduction is too strong and thereby introduces edge flicker.

SUMMARY OF THE INVENTION

Thus, an objective of the present invention is to provide an image processing method, which can effectively alleviate the halo effect caused by an interpolated frame, to solve the problems of the related art.

In an embodiment of the present invention, an image processing method is disclosed. The image processing method comprises the following steps: receiving an image signal, wherein the image signal comprises a first frame and a second frame; determining edges of a foreground in the first frame and the second frame according to at least one motion vector of the first frame and the second frame; determining an edge of the foreground in an interpolated frame according to the edge of the foreground in the first frame and the edge of the foreground in the second frame; and directly using one or more motion vectors of a background adjacent to the foreground in the first frame or the second frame to serve as one or more motion vectors of an outer region of the edge of the foreground in the interpolated frame.

In another embodiment of the present invention, an image processing circuit is disclosed, which comprises a receiving circuit and a motion estimation and motion compensation (MEMC) circuit. In operations of the image processing circuit, the receiving circuit is configured to receive an image signal, wherein the image signal comprises a first frame and a second frame; the MEMC circuit is configured to determine edges of a foreground in the first frame and the second frame according to at least one motion vector of the first frame and the second frame, determine an edge of the foreground in an interpolated frame according to the edge of the foreground in the first frame and the edge of the foreground in the second frame, and directly use one or more motion vectors of a background adjacent to the foreground in the first frame or the second frame to serve as one or more motion vectors of an outer region of the edge of the foreground in the interpolated frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
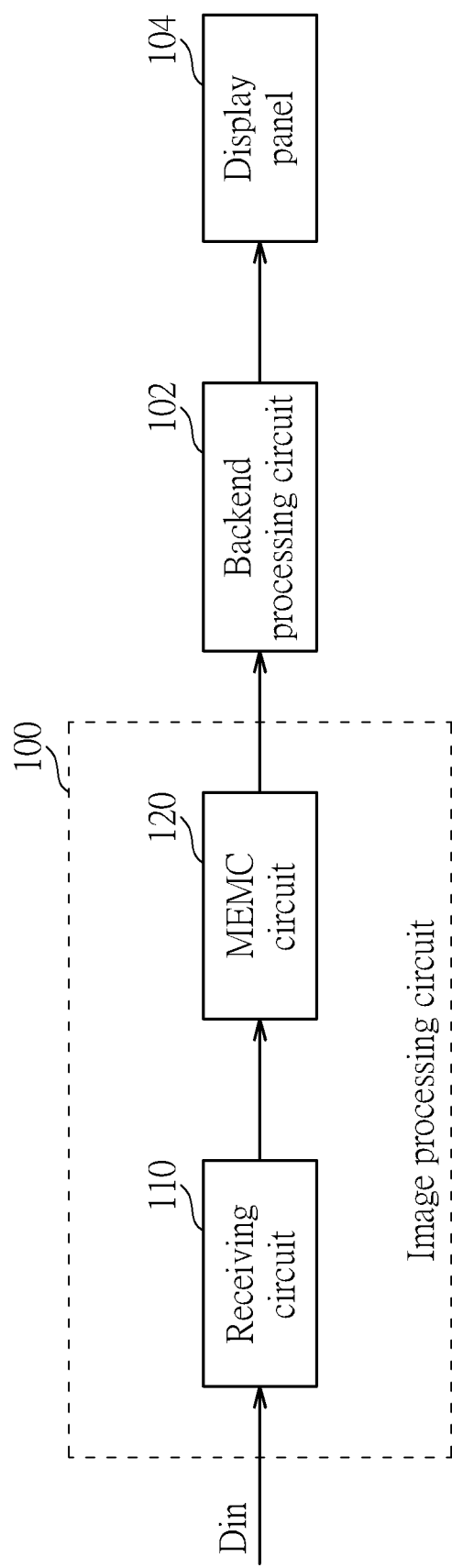
FIG. 1 is a diagram illustrating an image processing circuit according to an embodiment of the present invention.

FIG. 1 is a diagram illustrating an image processing circuit 100 according to an embodiment of the present invention. As shown in FIG. 1, the image processing circuit 100 comprises a receiving circuit 110 and a motion estimation and motion compensation (MEMC) circuit 120. In this embodiment, the image processing circuit 100 may perform operations of increasing frame rates, for example, the image processing circuit 100 receives an image signal Din and generates a plurality of interpolated frames according to a plurality of frames of the image signal Din, where the plurality of frames and the plurality of interpolated frames are transmitted to a display panel 104 through a backend processing circuit 102 for displaying.

Figure 2:
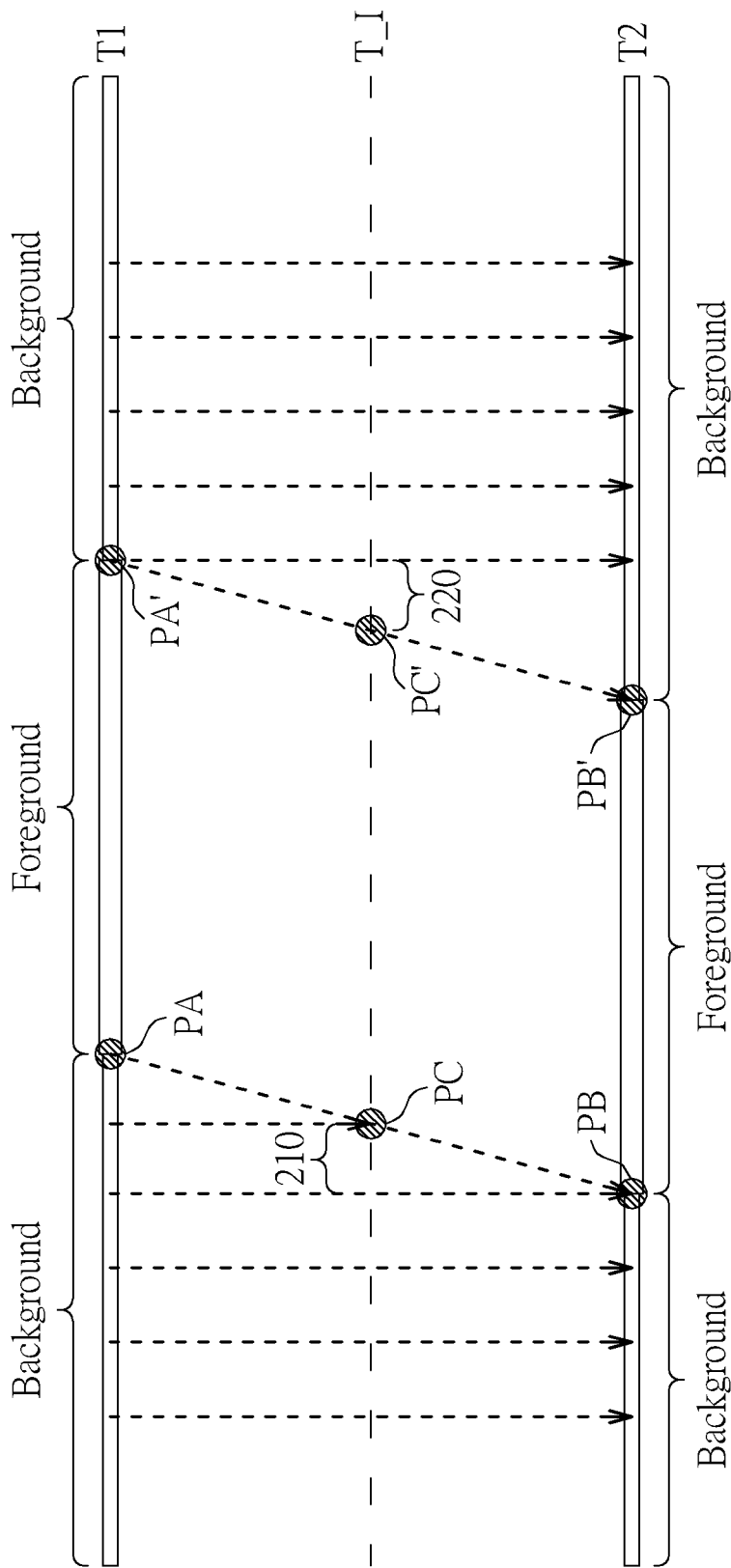
FIG. 2 is a diagram illustrating modification of motion vectors of an outer region of an edge of a foreground in an interpolated frame according to an embodiment of the present invention.

Regarding detailed operations of the image processing circuit 100, the receiving circuit 110 receives the image signal Din, where the image signal Din comprises a first frame T1 and a second frame t2 shown in FIG. 2. The MEMC circuit 120 then generates an interpolated frame T_I according to contents of the first frame T1 and the second frame T2, where those skilled in the art should understand operations of generating the interpolated frame T_I, which is therefore omitted for brevity. Additionally, since a foreground object in the first frame T1 and the second frame T2 may move relative to the background, a conventional motion estimation manner may make motion vector(s) of a junction of the foreground object and the background in the interpolated frame T_I inaccurate, thereby causing the halo effect mentioned in the related art. Thus, after the motion vector(s) and related image information of the interpolated frame T_I are generated in this embodiment, motion vector(s) of an outer region of a foreground (such as the foreground object) in the interpolated frame T_I is further modified according to motion vector(s) of the first frame T1 and the second frame T2, to prevent the first frame T1, the interpolated frame T_I and the second frame T2 from the halo effect when being displayed on the display panel 104.

More specifically, the MEMC circuit 120 may determine edges of the foreground in the first frame T1 and the second frame T2 according to at least one motion vector of the first frame T1 and the second frame T2, such as the edge PA of the foreground in the first frame T1 and the edge PB of the foreground in the second frame T2 shown in FIG. 2. In an embodiment, the foreground shown in FIG. 2 may comprise at least one block; taking the foreground as a block for illustrative purposes, a movement amount of the foreground of the first frame T1 to the second frame T2 may be regarded as a motion vector, and the edges PA, PB are edges of the block that is respectively in the first frame T1 and the second frame T2. The MEMC circuit 120 then determines an edge PC of the foreground in the interpolated frame T_I according to the edge PA of the foreground in the first frame T1 and the edge PB of the foreground in the second frame T2; for example, a center point between the edges PA and PB may be calculated to serve as the edge PC. Then, since an outer region 210 of the edge PC of the foreground in the interpolated frame T_I and the background adjacent to the foreground in the first frame T1 correspond to a same location (a same pixel location), the MEMC circuit 120 directly uses motion vector(s) of the background at the left-side of the foreground in the first frame T1 to serve as motion vector(s) of the outer region 210 of the edge PC of the foreground in the interpolated frame T_I. For example, assuming that a background region of the first frame T1 that is directly above the outer region 210 of the edge PC of the foreground in the interpolated frame T_I has a motion vector MV1 (i.e. a movement amount of a block of the background region relative to a reference frame), the motion vector(s) of the region 210 may be directly modified as MV1 (i.e. the movement amount of the block relative to the reference frame).

In another embodiment, the foreground further has edges PA' and PB' in the first frame T1 and the second frame T2, and the MEMC circuit 120 determines an edge PC' of the foreground in the interpolated frame T_I according to an the edge PA' of the foreground in the first frame T1 and the edge PB' of the foreground in the second frame T2; for example, a center point of the edges PA' and PB' may be calculated to serve as the edge PC'. Then, since an outer region 220 of the edge PC' of the foreground in the interpolated frame T_I and the background adjacent to the foreground in the second frame T2 correspond to a same location (a same pixel location), the MEMC circuit 120 directly uses motion vector(s) of the background at the right-side of the foreground in the second frame T2 to serve as motion vector(s) of the outer region 220 of the edge PC' of the foreground in the interpolated frame T_I. For example, assuming that a background region of the second frame T2 that is directly below the outer region 220 of the edge PC' of the foreground in the interpolated frame T_I has a motion vector MV2 (i.e. a movement amount of a block of the background region relative to a reference frame or the first frame T1), the motion vector(s) of the region 220 may be directly modified as MV2 (i.e. the movement amount of the block relative to the reference frame or the first frame T1).

As mentioned above, since the motion vector(s) of the outer region 210 of the edge PC and the outer region 220 of the edge PC' of the foreground in the interpolated frame T_I are directly modified as the motion vector(s) of the background of the first frame T1 or the second frame T2, the halo effect can be effectively reduced.

Figure 3:
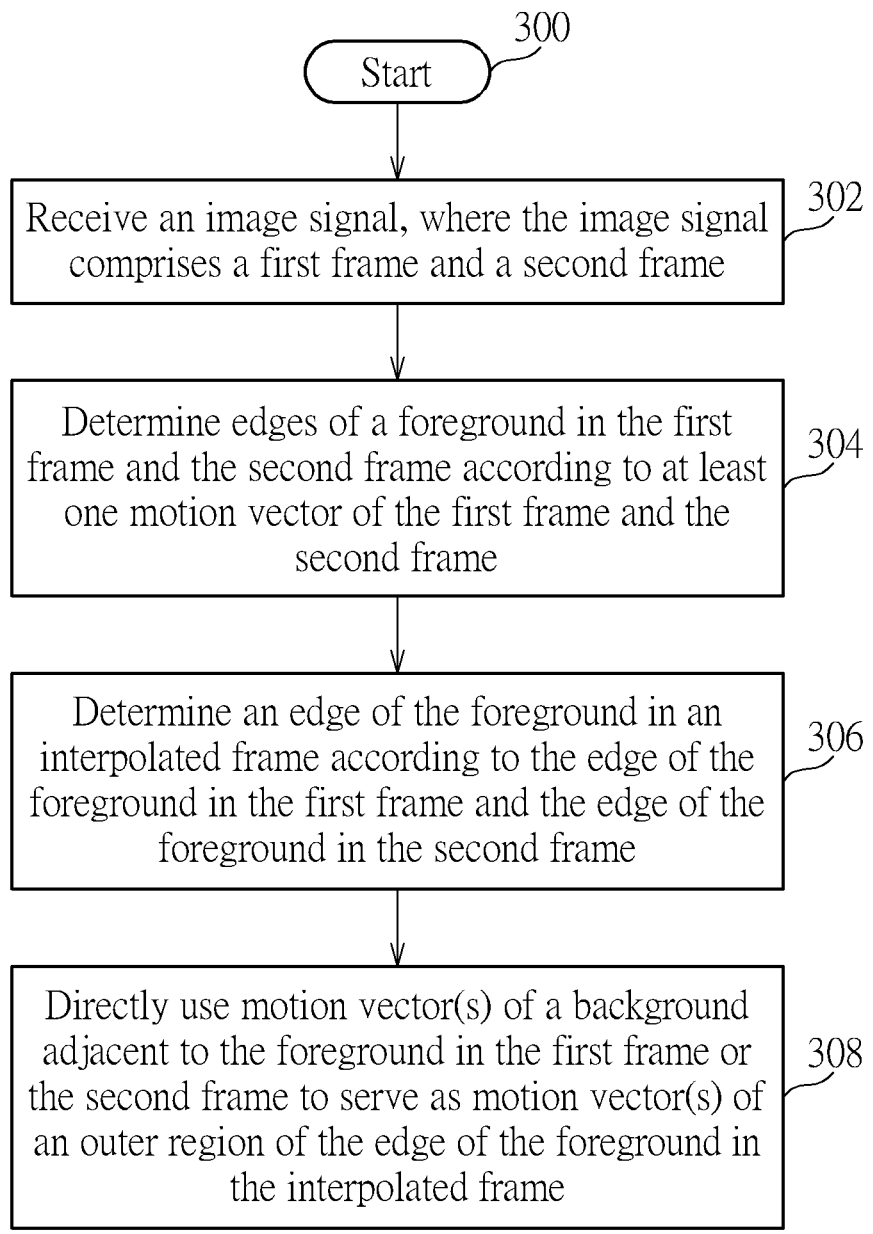
FIG. 3 is a flowchart illustrating an image processing method according to an embodiment of the present invention.

FIG. 3 is a flowchart illustrating an image processing method according to an embodiment of the present invention. Referring to FIGS. 1-3 and the above disclosed description, the flow is as follows.

Step 300: the flow starts.

Step 302: receive an image signal, where the image signal comprises a first frame and a second frame.

Step 304: determine edges of a foreground in the first frame and the second frame according to at least one motion vector of the first frame and the second frame.

Step 306: determine an edge of the foreground in an interpolated frame according to the edge of the foreground in the first frame and the edge of the foreground in the second frame.

Step 308: directly use one or more motion vectors of a background adjacent to the foreground in the first frame or the second frame to serve as one or more motion vectors of an outer region of the edge of the foreground in the interpolated frame.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
receiving an image signal, wherein the image signal comprises a first frame and a second frame;
determining edges of a foreground in the first frame and the second frame according to at least one motion vector of the first frame and the second frame;
determining an edge of the foreground in an interpolated frame according to the edge of the foreground in the first frame and the edge of the foreground in the second frame; and
directly using one or more motion vectors of a background adjacent to the foreground in the first frame or the second frame to serve as one or more motion vectors of an outer region of the edge of the foreground in the interpolated frame; wherein the one or more motion vectors of the background in the first frame or the second frame is/are movement amount of block(s) relative to a reference frame, and the one or more motion vectors of the outer region of the edge of the foreground in the interpolated frame is/are also the movement amount of the block(s) relative to the reference frame;
wherein the second frame immediately follows the first frame, and the step of directly using the one or more motion vectors of the background adjacent to the foreground in the first frame or the second frame to serve as the one or more motion vectors of the outer region of the edge of the foreground in the interpolated frame comprises:
when the outer region of the edge of the foreground and the background adjacent to the foreground in the first frame correspond to a same location, directly using the one or more motion vectors of the background adjacent to the foreground in the first frame to serve as the one or more motion vectors of the outer region of the edge of the foreground in the interpolated frame.

2. The image processing method of claim 1, wherein said at least one motion vector comprises a motion vector of a block of the first frame to a block of the second frame, an edge of the block of the first frame serves as the edge of the foreground in the first frame, and an edge of the block of the second frame serves as the edge of the foreground in the second frame.

3. The image processing method of claim 1, further comprising:
generating the interpolated frame according to the first frame and the second frame; and
the step of directly using the one or more motion vectors of the background adjacent to the foreground in the first frame or the second frame to serve as the one or more motion vectors of the outer region of the edge of the foreground in the interpolated frame comprises:
resetting the one or more motion vectors of the outer region of the edge of the foreground in the interpolated frame as the one or more motion vectors of the background adjacent to the foreground in the first frame.

4. An image processing method, comprising:
receiving an image signal, wherein the image signal comprises a first frame and a second frame;
determining edges of a foreground in the first frame and the second frame according to at least one motion vector of the first frame and the second frame;
determining an edge of the foreground in an interpolated frame according to the edge of the foreground in the first frame and the edge of the foreground in the second frame; and
directly using one or more motion vectors of a background adjacent to the foreground in the first frame or the second frame to serve as one or more motion vectors of an outer region of the edge of the foreground in the interpolated frame; wherein the one or more motion vectors of the background in the first frame or the second frame is/are movement amount of block(s) relative to a reference frame, and the one or more motion vectors of the outer region of the edge of the foreground in the interpolated frame is/are also the movement amount of the block(s) relative to the reference frame;
wherein the second frame immediately follows the first frame, and the step of directly using the one or more motion vectors of the background adjacent to the foreground in the first frame or the second frame to serve as the one or more motion vectors of the outer region of the edge of the foreground in the interpolated frame comprises:
when the outer region of the edge of the foreground and the background adjacent to the foreground in the second frame correspond to a same location, directly using the one or more motion vectors of the background adjacent to the foreground in the second frame to serve as the one or more motion vectors of the outer region of the edge of the foreground in the interpolated frame.

5. An image processing circuit, comprising:
a receiving circuit, configured to receive an image signal, wherein the image signal comprises a first frame and a second frame;
a motion estimation and motion compensation (MEMC) circuit, coupled to the receiving circuit, configured to determine edges of a foreground in the first frame and the second frame according to at least one motion vector of the first frame and the second frame, determine an edge of the foreground in an interpolated frame according to the edge of the foreground in the first frame and the edge of the foreground in the second frame, and directly use one or more motion vectors of a background adjacent to the foreground in the first frame or the second frame to serve as one or more motion vectors of an outer region of the edge of the foreground in the interpolated frame; wherein the one or more motion vectors of the background in the first frame or the second frame is/are movement amount of block(s) relative to a reference frame, and the one or more motion vectors of the outer region of the edge of the foreground in the interpolated frame is/are also the movement amount of the block(s) relative to the reference frame;
wherein the second frame immediately follows the first frame, and when the outer region of the edge of the foreground and the background adjacent to the foreground in the first frame correspond to a same location, the MEMC directly uses the one or more motion vectors of the background adjacent to the foreground in the first frame to serve as the one or more motion vectors of the outer region of the edge of the foreground in the interpolated frame.

6. The image processing circuit of claim 5, wherein said at least one motion vector comprises a motion vector of a block of the first frame to a block of the second frame, an edge of the block of the first frame serves as the edge of the foreground in the first frame, and an edge of the block of the second frame serves as the edge of the foreground in the second frame.

7. The image processing circuit of claim 5, wherein the MEMC circuit generates the interpolated frame according to the first frame and the second frame, and resets the one or more motion vectors of the outer region of the edge of the foreground in the interpolated frame as the one or more motion vectors of the background adjacent to the foreground in the first frame.

* * * * *